United States Patent

Roberts et al.

[11] Patent Number: 5,867,543
[45] Date of Patent: Feb. 2, 1999

[54] MULTI-RATE TRANSMISSION SYSTEM

[75] Inventors: Martin Roberts, Deanshanger, United Kingdom; Thomas A. Potter, Petaluma, Calif.

[73] Assignee: DSC Communications Corporation, Plano, Tex.

[21] Appl. No.: 625,716

[22] Filed: Mar. 29, 1996

[51] Int. Cl.⁶ .................................................. O00O 00/00
[52] U.S. Cl. .......................... 375/365; 375/377; 375/368; 375/536; 375/538; 375/542; 375/914; 375/916; 370/536; 370/538; 370/542; 370/914; 370/916
[58] Field of Search .................................. 375/377, 371, 375/372, 368, 365, 362, 364; 370/537, 538, 914, 916, 542, 543, 536, 544, 503

[56] References Cited

U.S. PATENT DOCUMENTS

| | | |
|---|---|---|
| 4,445,215 | 4/1984 | Svendsen . |
| 4,827,477 | 5/1989 | Avaneas . |
| 4,833,671 | 5/1989 | Becknet et al. . |
| 4,939,723 | 7/1990 | Harley, Jr. et al. . |
| 5,490,282 | 2/1996 | Dreps E Tla . |
| 5,526,297 | 6/1996 | Snyder, Jr. et al. ................... 375/368 |

FOREIGN PATENT DOCUMENTS

| | | | |
|---|---|---|---|
| 0346896 | 6/1989 | European Pat. Off. | ......... H03M 9/00 |
| 0535768 | 9/1992 | European Pat. Off. | ........... H04J 3/06 |

*Primary Examiner*—Don N. Vo
*Attorney, Agent, or Firm*—Baker & Botts, L.L.P.

[57] ABSTRACT

A multi-rate transmission system (10) includes a receive section (12) and a transmit section (14). The receive section includes a receiver (16), a clock recovery unit (18), and a serial to parallel converter (20) all operating at a first clock rate (M). The receiver (16) also has a frame recovery unit (22) that operates at any of a plurality of clock rates, including the first clock rate (M) and a second clock rate (M/n). When the frame recovery unit operates at the first clock rate (M), frame information received by the receiver section (12) has unique bits occupying each bit position associated with each clock pulse of the first clock rate (M). When the frame recovery unit (22) operates at the second clock rate (M/n), each unique bit of the frame information occupies a number of bit positions according to a ratio of the first clock rate (M) to the second clock rate (M/n). Similar operation occurs with respect to a frame formatter (30) in the transmit section (14) of the multi-rate transmission system (10).

10 Claims, 2 Drawing Sheets

MULTI-RATE TRANSMISSION SYSTEM

TECHNICAL FIELD OF THE INVENTION

The present invention relates in general to a telecommunications environment and more particularly to a multi-rate transmission system.

BACKGROUND OF THE INVENTION

Many modern transmission products, such as SONET fiber optic transmission systems, are required to have variants in order to operate at different clock rates. Development of these products becomes unnecessarily complicated and time consuming because one set of components is required for one clock rate and another set of components is required for another clock rate. Upgrading the transmission system or changing the clock rate requires disposal and replacement of a large number of components, significantly increasing the cost and design cycle time of the system. Further, changes in system clock rates cannot be performed remotely, requiring the system to suffer down time in order to affect the changes. Therefore, it is desirable to have a transmission system that can perform in response to changes in clock rates without adversely affecting performance and development.

SUMMARY OF THE INVENTION

From the foregoing, it may be appreciated that a need has arisen for a transmission system that provides multirate operation. In accordance with the present invention, a multi-rate transmission system is provided that substantially eliminates or reduces disadvantages and problems associated with conventional fixed rate transmission systems.

According to an embodiment of the present invention, there is provided a multi-rate transmission system that includes a receiver capable of receiving a serial data stream. The serial data stream has a first clock rate. A clock recovery unit generates a first clock signal with the first clock rate in response to the serial data stream. A serial to data converter converts the serial data stream into a parallel format in response to the first clock signal. A frame recovery unit places the parallel format into a frame format. The frame recovery unit is capable of operating at any of a plurality of clock rates to include the first clock rate. With the frame recovery unit operating at the first clock rate, the serial data stream is made up of a plurality of consecutive unique bits. With the frame recovery unit operating at a second clock rate that is an integer value fraction of the first clock rate, the serial data stream is made up of unique bits wherein each unique bit occupies a number of consecutive bit positions equal to the integer value in order to provide multi-rate operation.

The present invention provides various technical advantages over conventional fixed rate transmission systems. For example, the multi-rate transmission system can operate with any of a plurality of clock rates. Another technical advantage is that unique bits can be repeated to adjust for differences in clock rates between system components. Yet another technical advantage is the ability to remotely change the operating clock rate without swapping out system components. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
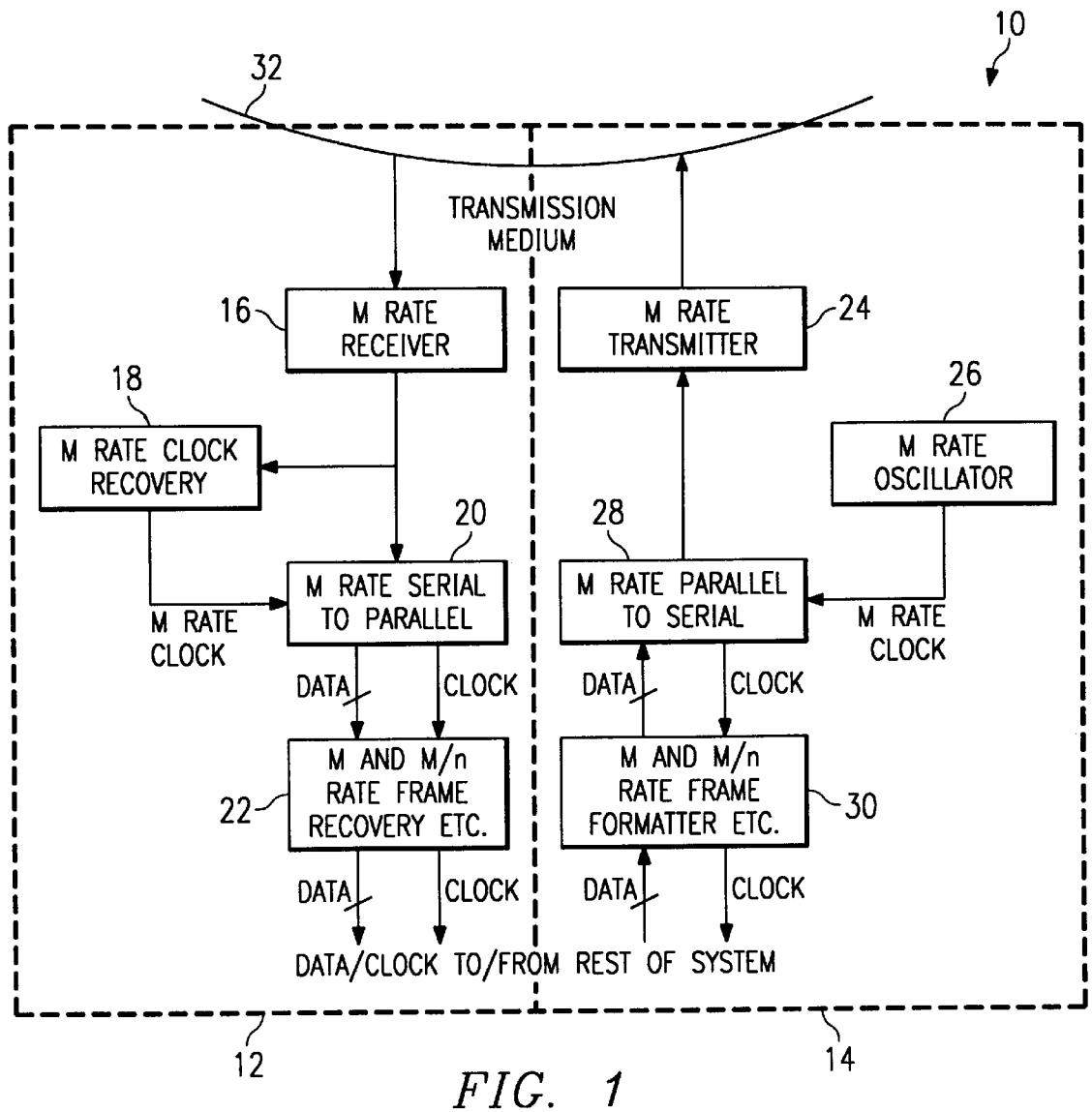
FIG. 1 illustrates a simplified block diagram of a multi-rate transmission system.

FIG. 1 is a simplified block diagram of a multi-rate transmission system 10. Multi-rate transmission system 10 includes a receive section 12 and a transmit section 14. Receive section 12 includes a receiver 16, a clock recovery unit 18, and a serial to parallel converter 20 operating at a first clock rate M. Receiver section 12 also has a frame recovery unit 22 operating at any one of a plurality of clock rates, including first clock rate M and a second clock rate M/n. Transmitter section 14 includes a transmitter 24, an oscillator 26, and a parallel to serial converter 28 operating at first clock rate M. Transmitter 14 also has a frame formatter 30 operating at any one of a plurality of clock rates, including first clock rate M and second clock rate M/n.

In operation, a serial data stream is provided to receiver 16 of receiver section 12 from a transmission medium 32. Transmission medium 32 may be any conventional carrier of telecommunications information to include a fiber optic communication path. Clock recovery unit 18 generates a receive clock signal having first clock rate M in response to the serial data stream received by receiver 16. Serial to parallel converter 20 converts the serial data stream into a parallel format in response to the receive clock signal generated by clock recovery unit 18. Frame recovery unit 22 identifies the frame information transferred by the serial data stream for further processing by telecommunication components in communication with receiver section 12.

Figure 2:
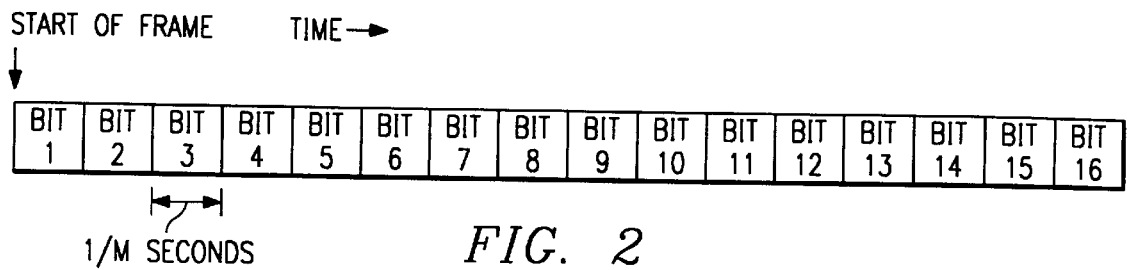
FIG. 2 illustrates a bit sequence of a receive side of the multi-rate transmission system at a first clock rate.

FIG. 2 shows a bit sequence of the serial data stream for frame recovery unit 22 operating at first clock rate M. Each bit position of the serial data stream has a unique bit associated therewith at each clock pulse of the frame information transported from transmission medium 32. Frame recovery unit 22 selects every bit position of the received data in order to properly interpret the data for appropriate processing.

Figure 3:
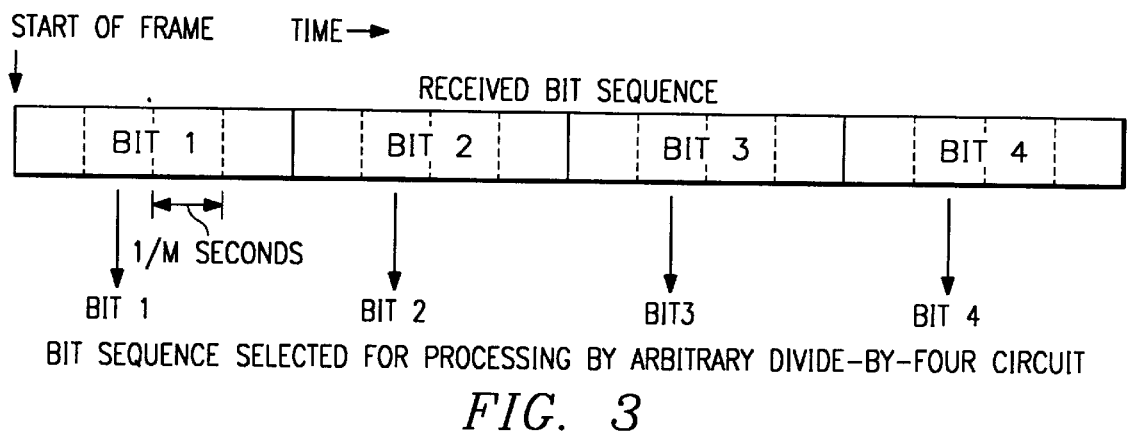
FIG. 3 illustrates a bit sequence of the receive side of the multi-rate transmission system at a second clock rate.

FIG. 3 shows a bit sequence of the serial data stream for frame recovery unit 22 operating at second clock rate M/n, where n is equal to 4. Each unique bit of the frame information occupies a number of bit positions corresponding to first clock rate M associated with an integer value ratio between first clock rate M and second clock rate M/n. For the example shown, each unique bit of the frame information occupies four bit positions of first clock rate M. Frame recovery unit 22 receives data at first clock rate M with each unique bit spanning four clock pulses of first clock rate M. Frame recovery unit 22 continues to operate at first clock rate M, but selects every fourth bit position of the received data in order to correctly interpret the data. Frame recovery unit 22 arbitrarily selects the every fourth bit position sequence. Though frame recovery unit 22 does not know where the boundaries are for each bit position, arbitrary selection will result in recovery of a valid bit sequence.

For operation of transmit section 14, frame formatter 30 receives unframed data from processing components in communication with transmit section 14 and provides the appropriate overhead and data manipulation according to the clock rate desired for proper transmission of frame information. Frame formatter 30 generates a parallel format from the frame information that is converted into a serial data stream by parallel to serial converter 28. Oscillator 26 generates a transmit clock signal having first clock rate M to drive parallel to serial converter 28. Transmitter 24 places the serial data stream onto transmission medium 32 at first clock rate M.

For operation at first clock rate M, frame formatter 30 processes the frame information such that a unique bit is present at each bit position of the serial data stream for each clock pulse of first clock rate M as shown in FIG. 2.

Figure 4:
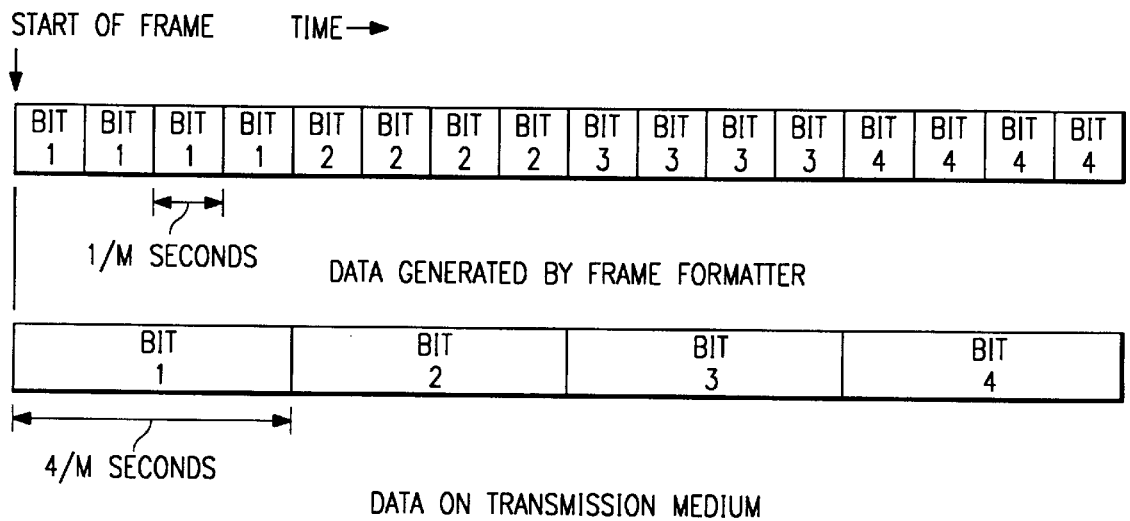
FIG. 4 illustrates a bit sequence of a transmit side of the multi-rate transmission system at the second clock rate.

FIG. 4 shows a bit sequence of the serial data stream for frame formatter 30 operating at second clock rate M/n, where n is equal to 4. Each unique bit of the frame information is repeated a number of times associated with the integer value ratio between first clock rate M and second clock rate M/n. For the example shown, four repeats of each unique bit of the frame information are performed by frame formatter 30. This allows for frame formatter 30 to provide data on transmission medium 32 at the slower second clock rate M/n through the components of transmit section 14 operate at the faster first clock rate M.

Frame information can be transported at a maximum clock rate or at any integer value fraction of the maximum clock rate in the telecommunications environment. The clock rate for multi-rate transmission system 10 can be changed through software modifications without replacing all the components of multi-rate transmission system 10.

In summary, a multi-rate transmission system can operate at a plurality of rates by having the majority of components operating at a fixed first clock rate and a single multi-rate component on both the receive and transmit side operating at any of a plurality of clock rates. Unique bits occupy each bit position of a serial data stream when all components operate at the first clock rate. Unique bits are repeated into a number of bit positions in the serial data stream when the single multi-rate component of both the receive and transmit side operates at a second clock rate which is an integer fraction of the fixed first clock rate.

Thus, it is apparent that there has been provided in accordance with the present invention, a multi-rate transmission system that satisfies the advantages set forth above. Although the present invention has been described in detail, it should be understood that various changes, substitutions, and alterations readily ascertainable to one skilled in the art can be made herein without departing from the spirit and scope of the present invention as defined by the following claims.

What is claimed is:

1. A multi-rate transmission system, comprising:
   a receiver operable to receive a serial data stream, the serial data stream having a first clock rate;
   a clock recovery unit operable to generate a first clock signal in response to the serial data stream, the first clock signal having the first clock rate;
   a serial to parallel converter operable to convert the serial data stream into a parallel format in response to only the first clock signal;
   a frame recovery unit operable to recover frame information from the parallel format, the frame recovery unit operating at only one of a plurality of second clock rates.

2. The multi-rate transmission system of claim 1, wherein the second clock rate is identical to the first clock rate, the serial data stream being comprised of unique bits at each clock pulse of the first clock rate.

3. The multi-rate transmission system of claim 1, wherein the second clock rate is an integer value fraction of the first clock rate.

4. The multi-rate transmission system of claim 3, wherein the serial data stream has a plurality of unique bits, each unique bit being repeated in a number of consecutive bit positions, wherein the number equals the integer value.

5. The multi-rate transmission system of claim 4, wherein the frame recovery unit selects every nth bit of the serial data stream according to the second clock rate.

6. A multi-rate transmission system, comprising:
   a clock oscillator operable to generate a clock signal at a first clock rate;
   a frame formatter operable to generate frame information into a parallel format in response to receipt of unframed data, the frame formatter operating at one of a plurality of second clock rates the frame formatter generating repeated frame information in response to a difference between the first clock rate and the second clock rate;
   a parallel to serial converter operable to convert the parallel format into a serial data stream, the parallel to serial converter operating at only the first clock rate generated by the clock oscillator;
   a transmitter operable to send the serial data stream, the transmitter operating at the first clock rate.

7. The multi-rate transmission system of claim 6, wherein the second clock rate is identical to the first clock rate, each bit position of the frame information having a unique bit corresponding to a clock pulse of the first clock rate.

8. The multi-rate transmission system of claim 6, wherein the second clock rate is an integer value fraction of the first clock rate.

9. The multi-rate transmission system of claim 8, wherein the frame information has a plurality of unique bits, the frame formatter repeating each unique bit a number of times equal to the integer value.

10. The multi-rate transmission system of claim 9, wherein the serial data stream includes the plurality of unique bits, each unique bit occupying consecutive bit positions of the serial data stream according to the integer value.

* * * * *